United States Patent

Ono et al.

[11] Patent Number: 5,306,341
[45] Date of Patent: Apr. 26, 1994

[54] AQUEOUS PAINT ADDITIVE AND AQUEOUS PAINT COMPOSITION

[75] Inventors: Ichiro Ono; Shoji Ichinohe, both of Annaka, Japan

[73] Assignee: Shin-Etsu Chemical Co., Ltd., Tokyo, Japan

[21] Appl. No.: 91,709

[22] Filed: Jul. 15, 1993

[30] Foreign Application Priority Data

Jul. 16, 1992 [JP] Japan .................................. 4-212092

[51] Int. Cl.$^5$ .............................................. C07G 3/00
[52] U.S. Cl. .......................... 106/287.13; 106/287.14; 528/29
[58] Field of Search ...................... 106/278.13, 278.14; 528/29

[56] References Cited

U.S. PATENT DOCUMENTS

| 4,196,014 | 4/1980 | Taniyama et al. | 106/287.13 |
| 4,324,712 | 4/1982 | Vaughn, Jr. | 106/287.13 |
| 5,068,277 | 11/1991 | Vukov et al. | 106/287.13 |
| 5,112,393 | 5/1992 | Engel et al. | 106/287.14 |
| 5,132,047 | 7/1992 | Tanaka et al. | 106/287.14 |
| 5,209,775 | 5/1993 | Bank et al. | 106/287.13 |
| 5,213,617 | 5/1993 | Blizzard | 106/287.13 |

Primary Examiner—Mark L. Bell
Assistant Examiner—Willie J. Thompson
Attorney, Agent, or Firm—Millen, White, Zelano, & Branigan

[57] ABSTRACT

An additive comprising a triglycerol-modified silicone compound as an active ingredient is added to aqueous paint compositions for reducing the surface tension thereof for ensuring formation of a smooth coating free of defects.

6 Claims, No Drawings

AQUEOUS PAINT ADDITIVE AND AQUEOUS PAINT COMPOSITION

BACKGROUND OF THE INVENTION

1. Field of the Invention

This invention relates to an additive to aqueous paint. More particularly, it relates to an additive to aqueous paint for improving the wettability thereof for preventing coating defects such as craters, cissing and pinholes.

2. Prior Art

Although a great variety of paints are known in the art, most of currently used paints are solvent base paints containing organic solvents as diluents. To meet a growing demand for environmental protection, the paint industry tends toward conversion from solvent base paints causing air pollution to aqueous paints causing less pollution.

Aqueous paints are less polluting and ensure safe application since the diluent is non-toxic, non-dangerous water, but suffer from several drawbacks associated with water. The most serious drawback of aqueous paints is the likelihood of forming coating defects such as craters, cissing and pinholes due to the high surface tension of water. Known approaches for preventing such coating defects include the addition of (1) amphiphatic solvents such as alcohols and cellosolves, (2) anionic, cationic, nonionic and ampholytic surface-active agents, and (3) polyether-modified silicone compounds. These additives function to lower the surface tension of paint systems for improving their wettability to objects to be coated. Additives (2) and (3) are commercially available as aqueous paint additives. However, they are not fully satisfactory.

SUMMARY OF THE INVENTION

Therefore, an object of the present invention is to provide an additive for aqueous paint systems capable of further lowering the surface tension of the paint systems for preventing coating defects such as craters, cissing and pinholes.

According to the present invention, there is provided an aqueous paint additive comprising a triglycerol-modified silicone compound of the following general formula (1) as an active ingredient.

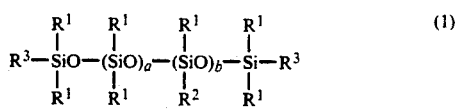

wherein $R^1$ is a monovalent hydrocarbon group having 1 to 10 carbon atoms, $R^2$ is a group of the following formula (A):

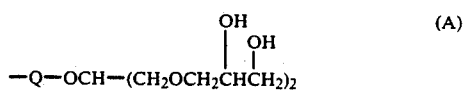

wherein Q is a divalent hydrocarbon group having 2 to 10 carbon atoms, $R^3$ is a monovalent hydrocarbon group having 1 to 10 carbon atoms or a group of formula (A), and letters a and b are positive integers inclusive of 0, with the proviso that at least one of the $R^3$ groups is a group of formula (A) when b is equal to 0.

When a triglycerol-modified silicone compound of formula (1) is added to an aqueous paint system such as a water-soluble paint system and an emulsion paint system using water as a dispersion medium, it is effective for lowering the surface tension of the paint system for improving the wettability thereof even though used in a relatively small amount. The aqueous paint system having the triglycerol-modified silicone compound added thereto produces a satisfactory coating which is smooth, flat, continuous and free of surface defects such as craters, cissing and pinholes.

Therefore, the present invention also provides an aqueous paint composition comprising an water-soluble paint composition using water as a main diluent or an emulsion paint composition using water as a dispersing medium, and the additive described above.

DETAILED DESCRIPTION OF THE INVENTION

The aqueous paint additive of the present invention is comprised of a triglycerol-modified silicone compound of formula (1) as an active ingredient.

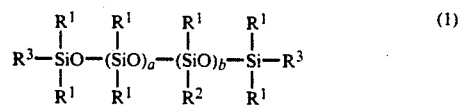

In formula (1), $R^1$ is a monovalent hydrocarbon group having 1 to 10 carbon atoms, for example, alkyl groups such as methyl, ethyl, propyl, cyclohexyl and decyl groups, aryl groups such as phenyl and tolyl groups, and aralkyl groups such as phenethyl and 2-methylphenethyl groups, with the methyl, ethyl and phenyl groups being preferred.

$R^2$ is a group of formula (A).

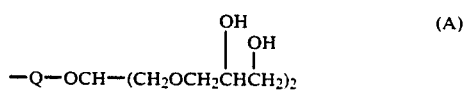

Q in the triglycerol group of formula (A) is a divalent hydrocarbon group having 2 to 10 carbon atoms, examples of which are given below.

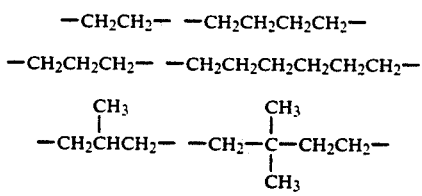

$R^3$ is a group like $R^1$ or a group of formula (A).

Letters a and b are integers of 0 or more. Although no upper limit need be imposed, too large molecular weights tend to aggravate compatibility with aqueous paint system and consequently, a is preferably in the range of 0 to 200 and b is preferably in the range of 0 to 50. Either one or both of the $R^3$ groups are groups of formula (A) when b is equal to 0.

The triglycerol-modified silicone compound of formula (1) may be prepared as shown by the following reaction scheme, for example, by effecting an addition reaction between a triglycerol derivative of formula (2) and an organohydrogenpolysiloxane of formula (3) in the presence of a platinum series catalyst to form an organosilicone compound of formula (4) and removing acetone from the organosilicone compound.

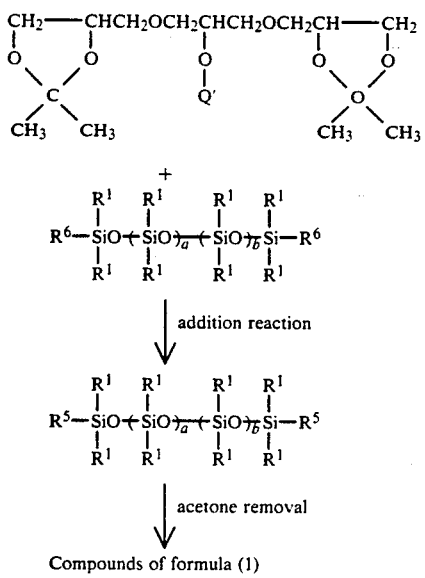

In the reaction scheme, Q' is a monovalent $C_2$-$C_{10}$ hydrocarbon group having a terminal double bond, $R^4$ is a group of formula (B):

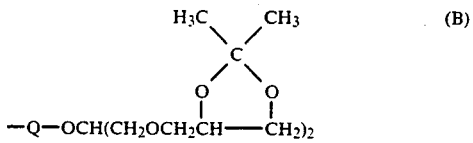

wherein Q is as defined above, $R^5$ is a monovalent $C_1$-$C_{10}$ hydrocarbon group or a group of formula (B), $R^6$ is a monovalent $C_1$-$C_{10}$ hydrocarbon group or a hydrogen atom, and $R^1$, a and b are as defined above.

The acetone removing reaction is generally carried out by adding 0.1 to 0.0001N diluted aqueous hydrochloric acid to the organosilicone compound of formula (4) to render the reaction system weakly acidic, and heating the system to 50° to 100° C. If desired, alcohols such a ethanol and isopropyl alcohol may be added to the system to improve contact between the compound of formula (4) and water.

Alternatively, the triglycerol-modified silicone compound of formula (1) may be prepared by previously removing acetone from a triglycerol derivative of formula (2) to form a triglycerol derivative of formula (5):

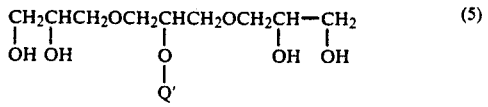

wherein Q' is as defined above, and effecting direct addition reaction between the triglycerol derivative of formula (5) and an organohydrogenpolysiloxane of formula (3) in the presence of a platinum series catalyst.

The aqueous paint additive of the invention which is comprised of the triglycerol-modified silicone compound of formula (1) as an active ingredient may be used by directly adding it to aqueous paint systems. For ease of operation, it is added to aqueous paint systems after diluting it with a solvent because the compound of formula (1) is a highly viscous liquid due to the presence of a triglycerol group.

The diluting solvents used herein are not critical as long as the triglycerol-modified silicone compound is soluble therein and they are compatible with aqueous paint systems. Examples of the solvent include water, methyl alcohol, ethyl alcohol, isopropyl alcohol, t-butyl alcohol, methyl cellosolve, ethyl cellosolve, butyl cellosolve, 3-methyl-3-methoxybutanol, methoxybutanol, methylcarbitol, ethylcarbitol, butylcarbitol, dioxane, methyl cellosolve acetate, cellosolve acetate, propylene glycol monomethyl ether, acetone, and methyl ethyl ketone alone or in admixture of two or more.

The additive of the invention can be added to any desired aqueous paint compositions including water-soluble paint compositions using water as a main diluent and emulsion paint compositions using water as a dispersing medium. Examples of the water-soluble paint include water-soluble alkyd resin paints, water-soluble acryl resin paints, water-soluble amino resin paints, water-soluble epoxy ester resin paints, water-soluble maleic polybutadiene resin paints, water-soluble maleic fatty acid ester resin paints, water-soluble maleic oil resin paints, water-soluble phenolic resin paints, and polyvinyl alcohol paints. Examples of the emulsion paint include vinyl acetate resin emulsion paints, vinyl acetate-ethylene copolymer emulsion paints, acrylic resin emulsion paints, and epoxy resin emulsion paints.

When the additive comprising a triglycerol-modified silicone compound of formula (1) as an active ingredient according to the invention is added to aqueous paint compositions, the optimum amount varies with a particular type of paint composition. Preferably the additive is added such that the paint composition may contain 0.01 to 5% by weight, especially 0.05 to 2% by weight of the triglycerol-modified silicone compound of formula (1). Less than 0.01% of the compound would be less effective for eliminating coating defects whereas more than 5% by weight of the compound gives no additional advantages and sometimes causes a loss of coating strength or the like.

The aqueous paint additive of the invention is well compatible or miscible with aqueous paint compositions and in small amounts, effective for reducing the surface tension of aqueous paint compositions and thus ensuring formation of satisfactory smooth coatings free of craters, cissing and pinholes.

EXAMPLE

Examples of the present invention are given below by way of illustration and not by way of limitation.

It is first described how to synthesize a triglycerol-modified silicone compound.

SYNTHESIS EXAMPLE

A 1-liter glass reactor equipped with a thermometer, agitator and condenser was charged with 79.9 grams (0.36 mol) of 1,1,1,3,5,5,5-heptamethyl-3-monohydrogentrisiloxane of formula (6), 324 grams (0.36 mol) of allyl diisopropylidene triglycerol of formula (7), 300 grams of toluene, and 0.1 gram of an ethanol solution of chloroplatinic acid. With toluene refluxing, reaction was continued for 50 hours. At this point, the completion of reaction was confirmed by determining the amount of ≡SiH remaining in the reaction solution. Then the toluene solvent was distilled off in vacuum, yielding 398 grams of an organosilicone compound of formula (8).

On measurement, the resultant compound was found to have a viscosity of 32.7 centistokes at 25° C. and an index of refraction of 1.4384. By $^{13}$C-NMR, it was identified to have the following structure.

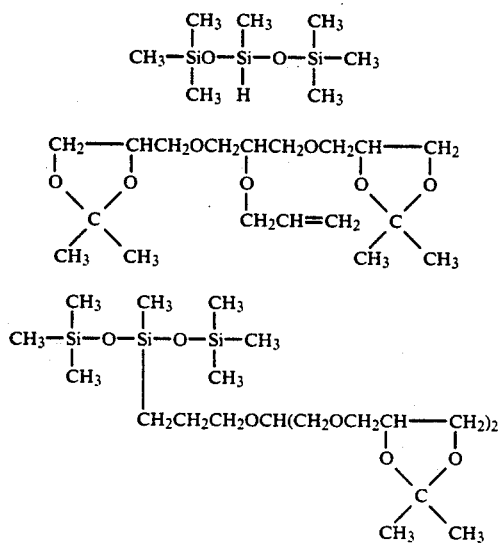

A similar 500-cc glass reactor was then charged with 100 grams of the compound of formula (8), 100 grams of ethanol and 100 grams of 0.01N hydrochloric acid. Acetone removing reaction was performed at 50° to 60° C. for three hours. At the end of reaction, the hydrochloric acid, water, ethanol and acetone were distilled off at 100° C./50 mmHg, yielding 79 grams of a triglycerol-modified silicone compound (S-1) represented by Formula (9).

On measurement, this compound was found to have a viscosity of 9,500 centipoise at 25° C. and an index of refraction of 1.4679. By $^{13}$C-NMR, it was identified to have the following structure.

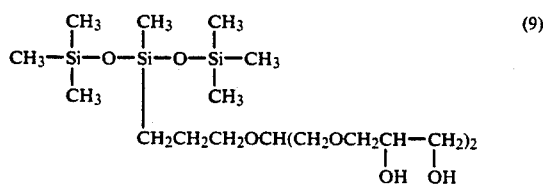

By following the above procedure, there were prepared triglycerol-modified silicone compounds (S-2) to (S-6) shown below.

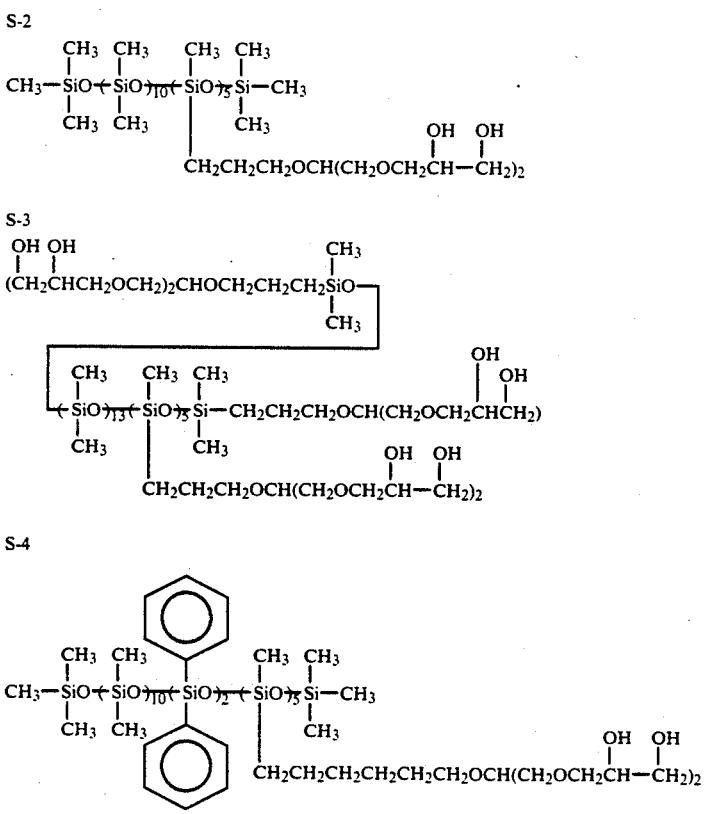

-continued

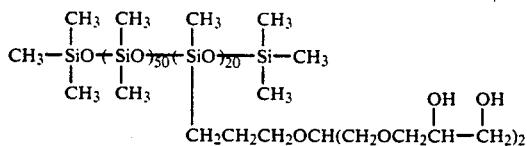

S-6
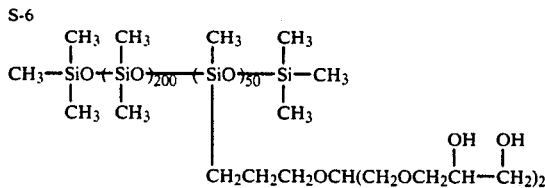

EXAMPLES 1-6

Aqueous paint additives were prepared by diluting triglycerol-modified silicone compounds (S-1) to (S-6) from Synthesis Example with isopropyl alcohol to a concentration of 30% by weight. A 1% aqueous solution of each additive was measured for surface tension. The results are shown in Table 1.

To a polyvinyl alcohol (PVA) paint composition in the form of a 5% aqueous solution of partially saponified polyvinyl alcohol (degree of saponification 88 mol %, commercially available as PA-18 from Shin-Etsu Chemical Co., Ltd.), each of the additives was added in a concentration of 0.5% by weight calculated as each compound (S-1) to (S-6). Each paint composition was then cast on a glass plate and air dried for 24 hours. The outer appearance of the coating was observed. The results are also shown in Table 1.

COMPARATIVE EXAMPLES 1-2

The same evaluation as in Examples was made in Comparative Example 1 where a poly-ether-modified silicone compound of the following average formula:

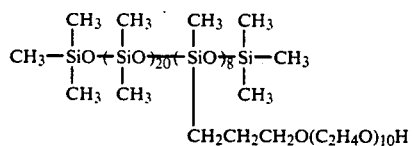

was used as the additive and in Comparative Example 2 where no additive was used.

TABLE 1

| | Type of silicone compound | Surface tension of 1% aqueous solution (dyne/cm) | Surface tension of PVA paint (dyne/cm) | Coating appearance |
|---|---|---|---|---|
| Example | | | | |
| 1 | S-1 | 21.9 | 22.0 | Good |
| 2 | S-2 | 21.0 | 21.3 | Good |
| 3 | S-3 | 22.4 | 22.5 | Good |
| 4 | S-4 | 20.9 | 21.1 | Good |
| 5 | S-5 | 20.8 | 20.9 | Good |
| 6 | S-6 | 20.5 | 20.7 | Good |
| Comparative Example | | | | |
| 1 | polyether silicone compound | 24.1 | 26.8 | craters |
| 2 | none | 72.0 | 42.4 | craters |

As seen from Table 1, where triglycerolmodified silicone compounds are used as the additive, the aqueous paint compositions are reduced in surface tension and thus improved in wetting as compared with Comparative Examples, resulting in acceptable coatings free of craters.

Although some preferred embodiments have been described, many modifications and variations may be made thereto in the light of the above teachings. It is therefore to be understood that within the scope of the appended claims, the invention may be practiced otherwise than as specifically described.

We claim:

1. An aqueous paint additive comprising as an active ingredient a triglycerol-modified silicone compound of the following formula (1):

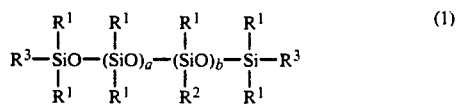

wherein $R^1$ is a monovalent hydrocarbon group having 1 to 10 carbon atoms, $R^2$ is a group of the following formula (A):

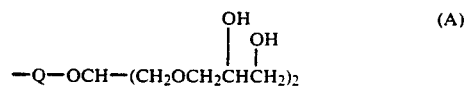

wherein Q is a divalent hydrocarbon group having 2 to 10 carbon atoms, $R^3$ is a monovalent hydrocarbon group having 1 to 10 carbon atoms or a group of formula (A), and letters a and b are positive integers inclusive of 0, with the proviso that at least one of the $R^3$ groups is a group of formula (A) when b is equal to 0.

2. An aqueous paint composition comprising a water-soluble paint composition using water as a main diluent or an emulsion paint composition using water as a dispersing medium, and an additive comprising a triglycerol-modified silicone compound of the following formula (1):

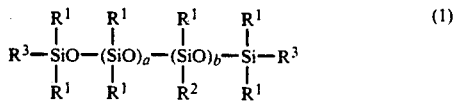

wherein $R^1$ is a monovalent hydrocarbon group having 1 to 10 carbon atoms,

R² is a group of the following formula (A):

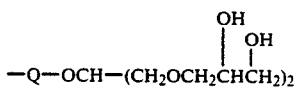
(A)

wherein Q is a divalent hydrocarbon group having 2 to 10 carbon atoms,

R³ is a monovalent hydrocarbon group having 1 to 10 carbon atoms or a group of formula (A), and letters a and b are positive integers inclusive of 0, with the proviso that at least one of the R³ groups is a group of formula (A) when b is equal to 0.

3. The aqueous paint composition according to claim 2, wherein the aqueous paint composition contains 0.01 to 5% by weight of the triglycerol-modified silicone compound of formula (1).

4. The aqueous paint additive of claim 1, wherein the R¹ groups are selected from the group consisting of alkyl groups of 1-10 carbon atoms, phenyl, tolyl, phenethyl or 2-methylphenethyl, Q is selected from the group consisting of the following formulae:

—CH₂CH₂—, —CH₂CH₂CH₂CH₂—,

—CH₂CH₂CH₂—, —CH₂CH₂CH₂CH₂CH₂CH₂—,

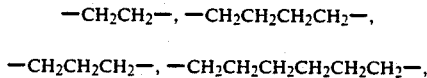

the R³ groups are selected from the groups recited above for R¹ or the formula (A) wherein Q is one of the formulae recited above, and a is 0–200 and b is 0–50.

5. The aqueous paint composition of claim 2, wherein in the additive the R¹ groups are selected from the group consisting of alkyl groups of 1-10 carbon atoms, phenyl, tolyl, phenethyl or 2-methylphenethyl, Q is selected from the group consisting of the following formulae:

—CH₂CH₂—, —CH₂CH₂CH₂CH₂—,

—CH₂CH₂CH₂—, —CH₂CH₂CH₂CH₂CH₂CH₂—,

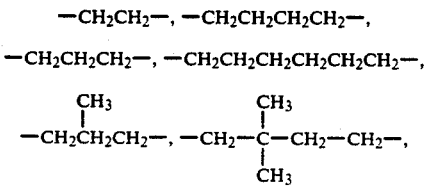

the R³ groups are selected from the groups recited above for R¹ or the formula (A) wherein Q is one of the formulae recited above, and a is 0–200 and b is 0–50.

6. The aqueous paint composition of claim 2, wherein the additive is present in an amount of 0.05 to 2.0% by weight.

* * * * *